(12) United States Patent
Hogarth et al.

(10) Patent No.: US 12,442,088 B2
(45) Date of Patent: Oct. 14, 2025

(54) ELECTRODE ASSEMBLY AND ELECTROLYSER

(71) Applicant: INEOS TECHNOLOGIES LIMITED, Jersey (GB)

(72) Inventors: Martin Philip Hogarth, Cheshire (GB); Laura Elizabeth Mawdsley, Lancashire (GB); Stefano Neodo, Nidau (CH)

(73) Assignee: INEOS TECHNOLOGIES LIMITED, Jersey (GB)

( * ) Notice: Subject to any disclaimer, the term of this patent is extended or adjusted under 35 U.S.C. 154(b) by 480 days.

(21) Appl. No.: 17/794,884

(22) PCT Filed: Jan. 11, 2021

(86) PCT No.: PCT/EP2021/050368
§ 371 (c)(1),
(2) Date: Jul. 22, 2022

(87) PCT Pub. No.: WO2021/148265
PCT Pub. Date: Jul. 29, 2021

(65) Prior Publication Data
US 2023/0079666 A1    Mar. 16, 2023

(30) Foreign Application Priority Data
Jan. 24, 2020 (EP) .................... 20153671

(51) Int. Cl.
*C25B 1/02* (2006.01)
*C25B 1/04* (2021.01)
(Continued)

(52) U.S. Cl.
CPC .............. *C25B 1/02* (2013.01); *C25B 1/04* (2013.01); *C25B 1/24* (2013.01); *C25B 1/26* (2013.01);
(Continued)

(58) Field of Classification Search
CPC ... C25B 11/037; C25B 11/052; C25B 11/053; C25B 11/055; C25B 11/065; C25B 11/067
See application file for complete search history.

(56) References Cited

U.S. PATENT DOCUMENTS

| 5,494,560 A | 2/1996 | Arimoto et al. |
| 5,770,035 A | 6/1998 | Faita |

(Continued)

FOREIGN PATENT DOCUMENTS

| CN | 1763251 | 4/2006 |
| CN | 107 858 701 | 8/2018 |

(Continued)

OTHER PUBLICATIONS

International Search Report for PCT/EP2021/050368 dated Apr. 7, 2021 (4 pages).

(Continued)

*Primary Examiner* — Brian W Cohen
(74) *Attorney, Agent, or Firm* — Nixon & Vanderhye PC (57) ABSTRACT

The present invention relates to an electrode assembly and an electrolyser using one or more of said assemblies, in particular the present invention provides an electrode assembly for the production of hydrogen comprising: i) an anode structure which comprises an anode located within an electrolysis compartment, ii) a cathode structure which comprises a cathode located within an electrolysis compartment containing a solution of an alkali metal hydroxide, characterised in that the cathode comprises: a) An electrically conductive metal substrate, and b) An electrocatalytic layer on the substrate and comprising a, at least one metal selected from platinum group metals, rhenium, nickel, cobalt and molybdenum and b. at least 50% by volume of an electrically conductive support material, wherein the electrically conductive support material is formed from particles having (Continued)

an average particle size of less than 5 microns (5 μm) and which are not metallic particles.

22 Claims, 1 Drawing Sheet (51) Int. Cl.
*C25B 1/24* (2021.01)
*C25B 1/26* (2006.01)
*C25B 9/40* (2021.01)
*C25B 9/73* (2021.01)
*C25B 9/77* (2021.01)
*C25B 11/031* (2021.01)
*C25B 11/037* (2021.01)
*C25B 11/053* (2021.01)
*C25B 11/065* (2021.01)
*C25B 11/081* (2021.01)

(52) U.S. Cl.
CPC .................. *C25B 9/40* (2021.01); *C25B 9/73* (2021.01); *C25B 9/77* (2021.01); *C25B 11/031* (2021.01); *C25B 11/037* (2021.01); *C25B 11/053* (2021.01); *C25B 11/065* (2021.01); *C25B 11/081* (2021.01)

(56) References Cited

U.S. PATENT DOCUMENTS

| | | |
|---|---|---|
| 6,200,457 B1 | 3/2001 | Durand et al. |
| 6,761,808 B1 | 7/2004 | Revill et al. |
| 7,083,708 B2 | 8/2006 | Chlistunoff et al. |
| 8,492,303 B2 * | 7/2013 | Bulan .................. C25B 11/093 502/313 |
| 9,677,183 B2 | 6/2017 | Kintrup et al. |
| 9,988,727 B2 | 6/2018 | Patru et al. |
| 2006/0231415 A1 | 10/2006 | Christensen |
| 2011/0024289 A1 | 2/2011 | Bulan et al. |
| 2011/0226627 A1 | 9/2011 | Krstajic et al. |
| 2014/0224666 A1 | 8/2014 | Kintrup et al. |
| 2014/0224667 A1 | 8/2014 | Kintrup et al. |
| 2015/0240369 A1 | 8/2015 | Jervis et al. |
| 2015/0368817 A1 * | 12/2015 | Xu ............................ C25B 9/40 204/252 |
| 2016/0369412 A1 | 12/2016 | Krasovic |
| 2017/0187046 A1 | 6/2017 | Huang et al. |
| 2018/0258543 A1 | 9/2018 | Rosvall et al. |
| 2020/0102660 A1 * | 4/2020 | Lewinski ................ C25B 13/08 |

FOREIGN PATENT DOCUMENTS

| | | |
|---|---|---|
| EP | 0 014 896 | 9/1980 |
| EP | 0 129 231 | 12/1984 |
| EP | 0 129 374 | 12/1984 |
| EP | 2 539 490 | 5/2015 |
| GB | 1 402 414 | 8/1975 |
| GB | 1 595 183 | 8/1981 |
| JP | 02-250994 | 10/1990 |
| JP | 2006-193768 | 7/2006 |
| JP | 2010-065283 | 3/2010 |
| JP | 2017-170426 | 9/2017 |
| JP | 2017-527693 | 9/2017 |
| JP | 2018-536766 | 12/2018 |
| JP | 2019-220401 | 12/2019 |
| WO | 01/28714 | 4/2001 |
| WO | 2004/021486 | 3/2004 |
| WO | 2009/149540 | 12/2009 |
| WO | 2016/011342 | 1/2016 |
| WO | 2016/169813 | 10/2016 |
| WO | 2017/100842 | 6/2017 |

OTHER PUBLICATIONS

Written Opinion of the ISA for PCT/EP2021/050368 dated Apr. 7, 2021 (5 pages).
Mohammadi, F. et al. "Co-Electrodeposition and Characterization of Ni+RuO2 Nano-Electrocatalyst for Hydrogen Evolution in Chlor-Alkali Process" Nano/Micro Eng! Neered and Molecular Systems, 2006. NEMS '06. 1st IEEE International Conference on, IEEE, PI, Jan. 1. 2006., pp. 1258-1262 (5 pages).
International Preliminary Report on Patentability for PCT/EP2021/050368, dated Jan. 13, 2022 (17 pages).
Lázaro et al., "Study and application of Vulcan XC-72 in low temperature fuel cells," ResearchGate, Jan. 2011, pp. 1-29.

* cited by examiner

ELECTRODE ASSEMBLY AND ELECTROLYSER

CROSS-REFERENCE TO RELATED APPLICATIONS

This application is the U.S. national phase of International Application No. PCT/EP2021/050368 filed Jan. 11, 2021 which designated the U.S. and claims priority to EP 20153671.1 filed Jan. 24, 2020, the entire contents of each of which are hereby incorporated by reference.

TECHNICAL FIELD

The present invention relates to an electrode assembly and an electrolyser using one or more of said assemblies, in particular for use in the electrolysis of alkali metal hydroxides.

BACKGROUND AND SUMMARY

Electrochemical processes are performed in two general types of cell that employ an anode (positive electrode), cathode (negative electrode) and a suitable electrolyte. At the anode electrode an oxidation reaction occurs, releasing electrons. These travel to the cathode electrode where a reduction process occurs. The reactions between the electrodes and the electrolyte depend on the chemistry of the cell. Sometimes the electrode materials are consumed and converted from one form into another. Alternatively, such as when used in the electrolysis of alkali metal hydroxides, the electrodes act as a mediator of electrical charge from a rectifier into the electrolyte, without their composition being affected. The process is completed by the migration of ions through the electrolyte from one electrode to the other.

In the Galvanic Cell (also known as the Voltaic Cell) the reactions occur spontaneously, to produce electrical power. This occurs because the net conversion of reactants to products is accompanied by a negative Gibbs Free Energy change. The magnitude of generated power depends on the rate of reaction (current) and the potential difference across the two electrodes in the cell (voltage). Examples of such devices includes fuel cells and batteries.

In the Electrolytic Cell, the Gibbs Free energy change of the overall process is positive and the reaction will not occur spontaneously. It must therefore be driven and maintained by a DC electrical power source. Examples of such devices include the alkaline electrolyser and the membrane chlor-alkali electrolyser.

By convention, the voltage (V) and current (I) delivered by the Galvanic Cell are positive and the power produced is equal to V*I. In Electrolytic devices, the flow of current is reversed and the voltage is negative.

A further classification of electrochemical devices is one which can switch between Galvanic and Electrolytic operation. An important example is the rechargeable cell (battery). In this device, during power generation mode (known as discharge) the potential difference across the cell is positive and the current flows forwards. During power consumption mode (known as recharging), the potential difference is reversed and the current flows in reverse. The electrodes in the device must therefore operate in both forward and reverse current configurations without being damaged to allow their use over many charge-discharge cycles. This process is accomplished by a reversible chemical reaction within the package.

An electrolyser is principally designed to operate with current flow in the forward direction. At open circuit (no current flowing), the electrodes will reach an equilibrium potential state (typical of reversible reactions) together with an equilibrium cell voltage. When the electrolyser is energised and current flows in the forward direction and the desired products are formed, the voltage is seen to increase dramatically (in the negative polarity by convention). The anode electrode potential increases while the cathode potential decreases, an effect known as polarisation. The magnitude of polarisation is often referred to as overpotential or overvoltage. An electrode which can only sustain the flow of current at a large overpotential causes a significant increase in energy consumption per unit of product formed.

During stable operation of the electrolyser, there is continuous consumption of the reactants to form the products, in effect converting the feed chemicals and consumed electrical energy into stored chemical potential energy. Normally the product chemicals (storing the chemical potential energy) are removed. However, when the electrolyser power is turned off, any products which remain in the locality of the electrodes can react spontaneously and the cell then operates in the Galvanic sense, thus discharging the stored energy. When this occurs, the anode electrode potential will fall below the reversible potential and simultaneously the cathode potential will rise above the reversible potential and current will flow in reverse through the cell, provided there is an electrical connection between anode and cathode. If the electrodes polarise by a significant amount in reverse, this can damage the electrodes, an effect which accumulates if reverse currents are encountered frequently.

The presentation of electrolyser performance data in the industry is generally reversed to this convention and cell voltage data presented in this manuscript as "negative polarity" is equivalent to this alternative convention.

The present invention is highly beneficial in bipolar electrolysers which can have large numbers of electrolysis compartments in series, leading to the generation of large reverse currents at shutdown, with the potential for rapid damage to unsuitable cathode coatings. However it is also beneficial in monopolar electrolysis where the process of shorting out the electrolyser to remove it from service prior to maintenance can generate significant reverse currents.

Much research has gone into reducing the overpotential in such systems. This includes the use of electrocatalyst coatings applied to the electrodes. Examples of electrolysers (in particular bipolar electrolysers) are described, for example in GB 1581348 or U.S. Pat. No. 6,761,808. Bipolar electrolysers for use in the electrolysis of aqueous solutions of alkali metal chloride and alkali metal hydroxide, to produce chlorine and hydrogen may comprise an electrode module comprising an anode which is suitably in the form of a plate or mesh of a film-forming metal, usually titanium and a cathode which is suitably in the form of a perforated plate of metal or mesh, usually nickel or mild steel. One or both electrodes may have an electrocatalytic coating. The anode and cathode are separated by a separator, typically a membrane, to form a module.

In a commercial modular electrolyser a multiplicity of such modules are placed in sequence with the anode of one bipolar module next to and electrically connected to the cathode of an adjacent bipolar module. Another type of bipolar electrolyser is a so-called "filter press electrolyser", for example as described in GB 1595183. In these electrolysers bipolar electrode units are formed comprising an anode structure and a cathode structure which are electrically connected to each other. The bipolar electrode units are then connected to adjacent bipolar electrode units via a separator and sealing means between flanges on the adjacent units, and the units compressed together to form a filter press electrolyser. Bipolar electrolysers can also be used for the production of oxygen and hydrogen. In this case the anode and cathode compartments can both include solutions of alkali metal hydroxide.

Examples of coatings applied to anodes for production of chlorine in such systems include US 2011/024289, US 2014/224666 and US 2014/224667.

The present invention, however, relates to coatings applied on a cathode, and in particular a cathode for use in the electrolysis of an alkali metal hydroxide. An example of a coating applied on a cathode is found in EP 0129374 B1, which describes the application of a mixture of a platinum group metal and a platinum group metal oxide to a metallic substrate, and which is said to provide an improvement in overpotential. Another example of a coating applied on a cathode is found in WO 01/28714. In this document, metal particles are coated with either an electrocatalytic metal or an electrocatalytic metal continuous phase in admixture with a particulate material to form a catalytic powder. The particulate material may be selected from a range of metal oxide materials. The catalytic powder, when applied as a coating on a cathode, is said to increase the surface area and reduce the overpotential.

An alternative option is described in CN 107858701 A. In this document there is provided a porous titanium substrate formed of particles of titanium of diameter 20 to 50 microns (20-50 μm). Vertically orientated titanium oxide nanotubes are grown from the surface of the substrate, and then precious metal nanoparticles are deposited thereon. Limited research work has gone into the development of electrode coatings which are tolerant to reverse currents. Examples of coating applied for the gas evolution of hydrogen are given in EP2539490B1 which claims several approaches for improving the reverse current tolerance of the cathode electrode. These include employing metal nitrate salts in preference to chlorides (specifically ruthenium nitrosyl nitrate) and the incorporation of stable Rare-Earth metals, such as praseodymium, which are shown to reduce the negative impact of cycling of cathode potential in a manner considered by the inventors to be equivalent to current reversal in the electrolyser. U.S. Pat. No. 5,494,560 discloses that a stable cathode having low hydrogen overvoltage can be produced by applying an electrode active layer on a substrate and comprising nickel, and at least one of platinum, rhodium, iridium and palladium supported on an active carbon. However, it is still desirable to produce cathodes which are both reverse current tolerant and have an improved overpotential.

We have now found an improved cathode can be obtained by the application of a particular coating on the cathode. Not only does the coating provide a low overpotential of the cathode, but it also provides a cathode with a stable overpotential over prolonged periods of operation. The cathode can provide a high level of reverse current tolerance. In particular, the cathodes of the present invention have been found to be stable to numerous cycles of shutdown and cell shorting. The stability of the cathodes increases their performance and their lifetime.

DETAILED DESCRIPTION

Figure 1:
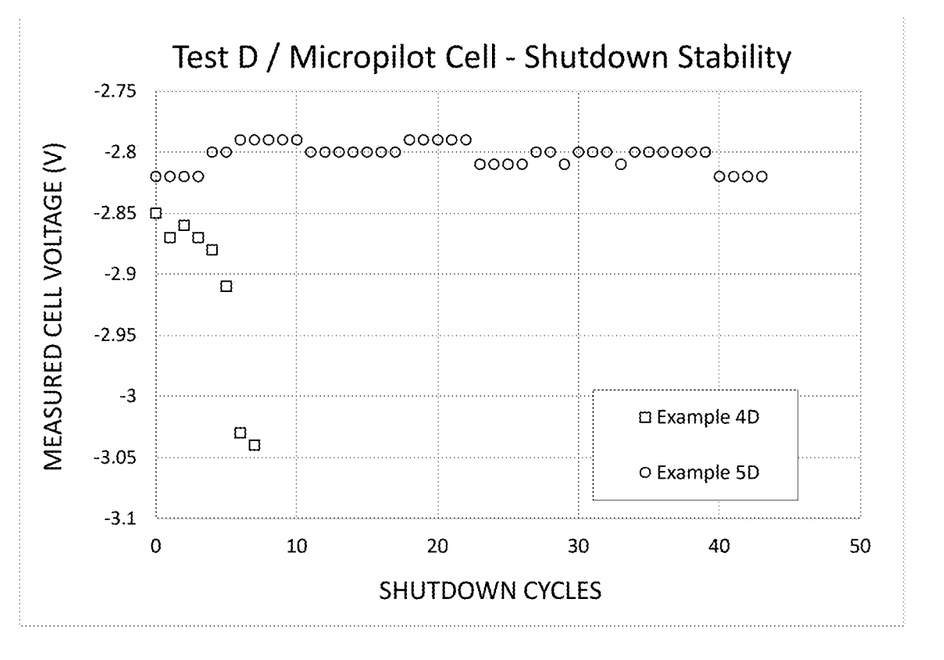
The FIGURE is a graph plotting cell voltage versus the number of shutdown cycles.

In a first aspect, the present invention provides an electrode assembly for the production of hydrogen comprising:
i) an anode structure which comprises an anode located within an electrolysis compartment,
ii) a cathode structure which comprises a cathode located within an electrolysis compartment containing a solution of an alkali metal hydroxide, characterised in that the cathode comprises:
a) An electrically conductive metal substrate, and
b) An electrocatalytic layer on the substrate and comprising
  a. at least one metal selected from platinum group metals, rhenium, nickel, cobalt and molybdenum and
  b. at least 50% by volume of an electrically conductive support material, wherein the electrically conductive support material is formed from particles having an average particle size of less than 5 microns (5 μm) and which are not metallic particles.

The cathode comprises an electrically conductive metal substrate. This substrate may be any conventional metal substrate known in the art. The electrically conductive metal substrate may be a rigid structure i.e. formed of a perforated metal plate or plates, optionally louvred (slatted). Alternatively the electrically conductive metal substrate may be in the form of a metal fabric or gauze, or a mesh, such as an expanded mesh or a woven mesh. Typical materials for the substrate include stainless steel, mild steel, nickel or copper. Nickel is preferred.

In the present invention an electrocatalytic layer is present on the substrate.

The electrocatalytic layer comprises at least one metal selected from platinum group metals, rhenium, nickel, cobalt and molybdenum. Preferably, the electrocatalytic layer comprises at least one platinum group metal. Platinum, palladium and ruthenium are preferred, either alone or mixed. Particularly preferred electrocatalytic layers comprise ruthenium, either alone or a mixture of ruthenium and platinum and/or palladium.

It should be noted that the "at least one metal" in the electrocatalytic layer, at least after deposition as described below, may be in a "metallic" form (i.e. as elemental metal) or may be in the form of a metal compound, such as an oxide. For example, ruthenium typically forms an oxide on heating in air after deposition.

The amount of the at least one metal applied to the electrode depends on the metals within the coating and the proportions of each and is chosen to provide the optimal balance of long operational lifetime and tolerance to reverse currents, reduced cell voltage and cost. Typically, the electrocatalytic layer comprises the at least one metal selected from platinum group metals, rhenium, nickel, cobalt and molybdenum in an amount of from 0.5-50 $g/m^2$, expressed as weight of metal per unit surface area of the conductive metal substrate (based on geometric surface area, prior to coating). The preferred values vary within this range.

For example, for coatings containing a platinum group metal, preferably, the electrocatalytic layer comprises the at least one metal selected from platinum group metals in an amount of from 0.5-20 $g/m^2$, expressed as weight of platinum group metal per unit surface area of the conductive metal substrate (prior to coating).

More specifically, for coatings containing platinum, the platinum is preferably present in the layer at levels 0.5-5 g $Pt/m^2$. Such levels provide acceptable lifetime and cost when using platinum. Layers comprising ruthenium, including where there are lesser quantities of other metals, (by molar ratio), preferably comprise 2-15 g Ru/m². The ruthenium may be used alone or in combination with other metals, particularly other platinum group metals. As an example when ruthenium and platinum are used in the molar ratio 9:1 Ru:Pt, this translates to a platinum coat weight of 2.15 g Pt/m² when the ruthenium coat weight is 10 g Ru/m². Layers comprising palladium preferably comprise 0.5-5 g Pd/m². Palladium may be used alone or in combination with other metals, particularly other platinum group metals. As an example when palladium and ruthenium are used in the ratio 9:1 Ru:Pd, this translates to a palladium coat weight of 1.2 g Pd/m² when the ruthenium coat weight is 10 g Ru/m².

The electrocatalytic layer further comprises at least 50% by volume of an electrically conductive support material, said material being formed of particles having an average particle size of less than 5 microns (5 μm) and which are not metallic particles.

The support material may be a metal oxide or other metal compound, or may be non-metallic, such as carbon. Some preferred materials are provided below. In general, the support material should be chemically and electrochemically stable under the conditions in the electrolyser and under conditions of reverse current flow. In particular, during use in the electrolyser the support material should not undergo any chemically or electrochemically induced changes that significantly affect the performance of the coating comprising the support material i.e. causing it to deteriorate in voltage performance in a short period of time relative to the normal lifetime of an electrode (which is typically a number of years). Chemical and electrochemical stability can be determined by analysing voltage performance in a suitable test. An example of one suitable test is described in the Examples of EP2539490B1. In the present invention the chemical and electrochemical stability can preferably be determined by the test described in Example 4 below. The test described in detail in Example 4 below operates for most of the time in "normal" operation i.e. electrolysis with a forward current. However, once per day the anode and cathode are shorted to cause a reverse current before the electrolyser is returned to the normal operation. This cycle is repeated whilst monitoring the stabilised cell voltage in normal operation. This allows multiple shutdowns to be performed in a relatively short period to simulate effects which would normally accumulate in a plant over several years' operation. In the present invention, the support materials are considered as chemically and electrochemically stable if in this test the voltage increases (negatively) by less than 100 mV of the initial voltage after 30 cycles. Preferably, the voltage increases (negatively) by less than 50 mV of the initial voltage after 30 cycles.

A particular feature of the present invention is that the electrically conductive support material is formed from particles having an average particle size of less than 5 microns (5 μm). Preferably the electrically conductive support material is formed from particles having an average particle size of less than 1 micron (1 μm), and even more preferably less than 0.5 microns (500 nanometers), such as 10 to 250 nanometers. Preferred particles have an average particle size of 20 to 100 nanometers.

As used herein, where the particles to be deposited are spherical or nearly spherical particles then the particle size for each individual particle is the diameter averaged over all directions i.e. the diameter of a sphere having the equivalent volume. The particle size does not, however, need to be determined for each particle individually, and the average particle size for the particles used can be determined by any conventional technique, such as using dynamic light scattering, electrophoretic light scattering, laser diffraction, electrozone sensing and sedimentation.

Where the particles to be deposited are elongated, such as nanotubes, the particle size as used herein should be taken as the size in the longest dimension, and the average particle size for the particles can determined based on this dimension accordingly. In U.S. Pat. No. 5,494,560, for example, the carbon particles used are within the range 10 to 100 microns (10 to 100 μm). Example 1 in U.S. Pat. No. 5,494,560 shows that this enables hydrogen overpotentials of 70 to 80 mV. With the present invention, however, overpotentials of 60 mV and below are routinely obtained. This is illustrated in the Examples below.

In particular, and without wishing to be bound by theory, it is considered that during application to the substrate the deposited particles form a porous layer with channels between the particles which provides both a desirable porosity and surface area in the electrocatalytic layer. The porosity is in the form of a three-dimensional network of channels between the deposited particles.

More particularly, preferably the channels between the particles have an average diameter ($D_{50}$) between 5 and 500 nm. In a most preferred embodiment, at least 50% of the total pore volume is due to pores with a diameter between 5 and 500 nm. In this embodiment the pore volume distribution should be measured using mercury-intrusion porosimetry according to ASTM D4284-12(2017) E1 ("Standard Test Method for Determining Pore Volume Distribution of Catalysts and Catalyst Carriers by Mercury Intrusion Porosimetry").

The electrically conductive support material, especially when said material comprises an electrically conductive carbon material as is discussed further below, typically has a surface area of at least 50 m²/g, such as at least 200 m²/g. The surface area may be up to 2000 m²/g, preferably up to 1500 m²/g, but most preferably is from 200 to 1000 m²/g (Surface area should be measured using ASTM D3663-03 (2015) "Standard Test Method for Surface Area of Catalysts and Catalyst Carriers").

The electrocatalyst layer is typically of thickness of 0.5 to 100 microns (0.5 to 100 μm), preferably 0.5 to 20 microns (0.5 to 20 μm). Preferably the layer is uniformly coated onto the substrate, by which is meant that the thickness at any point is within 50% of the average thickness. The coating covers the front, back and inside surfaces of the electrode. Coating is preferably achieved by spray-coating, optionally as multiple coats, as discussed further below.

It is particularly important in the present invention that the particles of the support material are electrically conductive but are not metallic particles. In particular, in circumstances of reverse current flow, the electrical conductivity has been found to allow the stored charge to dissipate. However, whilst metallic particles are electrically conductive it has been found that particles of some commonly used metals, such as nickel and ruthenium, tend not to be electrochemically stable. Such metals are lost from the coating by dissolution during the dissipation of the stored charge. On re-starting the process after a shut-down the efficiency of the coating is reduced when such metallic particles have been used as the support material. For example, it has been found that the use of transition metal supports in particle form, such as Raney nickel, offer limited voltage stability because they eventually deactivate as hydride is incorporated into the surface of the electrodes. Furthermore, they are prone to pyrolysis in contact with air during maintenance.

Without wishing to be bound by theory, a damage mechanism which can cause further deactivation of cathodes used in chlor alkali production may occur during cell trips as a result of migration of hypochlorite ions into the catholyte solution, driven by the reverse current. Reduction of the hypochlorite at the cathode then leads to oxidation of the metal as described by the equation:

$$OCl^- + H2O + 2e \rightarrow Cl^- + 2OH^- \text{(cathodic reaction)}$$

$$M \rightarrow M^{2+} + 2e \text{(anodic reaction)}$$

Preferably the electrically conductive support material has an electrical resistivity of less than $10^{-3}$ Ωm, for example $10^{-3}$ to $10^{-4}$ Ωm.

In one embodiment the electrically conductive support material may be an electrically conductive metal oxide. Examples include binary metal oxides such as titanium oxides (TiOx), tungsten oxides (WOx), molybdenum oxides (MoOx), cerium oxides ($CeO_x$), lanthanum oxides ($La_2O_3$) and manganese oxide (MnOx), indium oxide ($In_2O_3$), hafnium oxide ($HfO_2$), tantalum oxide ($Ta_2O_5$) and multicomponent metal oxides such as the super group of perovskite ($ABO_3$) and the pyrochlore ($A_2B_2O_6$) oxide families. Other examples include metal carbides, such as tungsten carbide.

It may be noted that some materials which can be used for the electrically conductive support material may be oxides of the metal which can be used as the "at least one metal" component of the electrocatalytic layer. Whilst this is the case, the two components are distinct, and two components must be present. In particular, the electrically conductive support material must be present in an amount of at least 50% by volume of the electrocatalytic layer, and must be formed from particles having a defined maximum size. The "at least one metal" must be supported on the electrically conductive support material. Thus, the two components are clearly distinct components even when formed of materials which are chemically related.

Preferably, the electrically conductive support material comprises an electrically conductive carbon material. Typical carbons include carbon black, graphite, acetylene black, graphene, single wall carbon nanotubes (SWCNT) and multiwall carbon nanotubes (MWCNT). Specific examples of suitable carbons include those sold by the Cabot Corporation under the tradename Vulcan XC-72R or Black Pearls 2000 available from the Cabot Corporation of the USA or Ketjen black EC600JD or EC300JD available from Lion Specialty Chemicals Co. Ltd of Japan. The carbon material may be used alone or with other carbons as the electrically conductive support material, or the one or more carbons may be mixed with one or more metal oxides, such as praseodymium oxide, neodymium oxide or one or more of the electrically conductive metal oxides chosen from the previous list of electrically conductive metal oxides.

Where the conductive support material is a carbon black it should be recognised that the combustion process used to generate carbon black produces so called 'primary particles' of carbon which can range in average size depending on the feedstock and combustion conditions, but are typically less than 500 nm. Due to their small size and high surface area these primary particles will clump together under the influence of Van Der Waals forces to form larger agglomerates which can range from 0.1 to 50 microns (0.1 to 50 μm) in size. The agglomerate size may preferably be 0.1 to 20 microns (0.1 to 20 μm). As used herein, however, reference to the electrically conductive support material formed of particles having an average particle size of less than a particular size (such as less than 5 microns (5 μm)) refers to the size of the primary particles in such cases not any agglomerates that may form.

In the present invention the electrocatalytic layer comprises at least 50% by volume of the electrically conductive support material i.e. at least 50%/the majority of the volume of the layer is made up of the support material. Preferably the electrocatalytic layer comprises at least 55% by volume, preferably at least 60% by volume, more preferably at least 80% by volume, and most preferably at least 90% by volume of the electrically conductive support material (i.e. preferably at least 55% by volume, preferably at least 60% by volume, more preferably at least 80% by volume, and most preferably at least 90% by volume of the electrocatalytic layer is electrically conductive support material.)

In addition to the electrically conductive support material, the electrocatalytic layer also comprises at least one metal selected from platinum group metals, rhenium, nickel, cobalt and molybdenum (these metals being hereinafter referred to as "electrocatalytic metals"). Typically these are present in an amount of from 0.1% by volume up to the balance of the layer, and preferably in an amount of from 0.2% by volume up to the balance of the layer. Thus, the electrocatalytic layer comprises less than 50% by volume, preferably of less than 45% by volume, preferably less than 40% by volume, more preferably less than 20% by volume, and most preferably less than 10% by volume of the electrocatalytic metals. (i.e. less than 50% by volume, preferably less than 45% by volume, preferably less than 40% by volume, more preferably less than 20% by volume, and most preferably less than 10% by volume of the electrocatalytic layer is electrocatalytic metals.)

Most preferably the electrocatalytic layer comprises 0.2 to 10% by volume of the layer of the at least one metal selected from platinum group metals, rhenium, nickel, cobalt and molybdenum and 90 to 99.8% by volume of the layer of the electrically conductive support material.

The amounts of the at least one electrocatalytic metal and electrically conductive support material expressed in moles depends on the relative densities of the respective materials. Where the electrically conductive support material is an electrically conductive carbon material then the electrocatalytic layer typically comprises 40 to 80% by moles of the at least one electrocatalytic metal and 60 to 20% by moles of the electrically conductive support material.

In WO 01/28714 the coating comprises either solely the electrocatalytic metal, or the electrocatalytic metal is a continuous phase with metal oxide particles embedded therein. In the present invention the support particles are selected to be electrically conductive, and are also the major component of the coating, with the at least one electrocatalytic metal supported thereon. This offers the advantage that the active surface area per gram of the at least one electrocatalytic metal is significantly higher which leads to lower cathode overpotential, increased tolerance of impurities and affords the opportunity to reduce the quantity of the at least one electrocatalytic metal required to deliver an equivalent catalytic activity, hence reducing cost.

In the present invention the at least one electrocatalytic metal may be supported on the electrically conductive support material in the electrocatalytic layer by any suitable method.

Preferably a material in which at least one electrocatalytic metal is supported on the electrically conductive support material is provided prior to coating. For example, such materials can be purchased pre-formed or produced prior to coating. However, it is also possible to supply a physical mixture of the electrocatalytic metal or metals and the electrically conductive support material and apply the mixture to the substrate, so the at least one electrocatalytic metal will become supported only during the application.

The electrocatalytic metal may be present on the surface of electrically conductive support in the form of a continuous layer or it may be dispersed on the electroconductive support as particles.

In general (including whether the electrocatalytic metal is supported on the electrically conductive support material prior to deposition/coating or whether supplied separately during deposition/coating), where the electrocatalytic metal is present in the form of particles the average particle size of the particles of the electrocatalytic metal which are deposited is usually significantly less than the average particle size of electrically conductive support material used in the electrocatalytic layer. Typically, the average particle size of the particles of the electrocatalytic metal which are deposited is less than 20% of the average particle size of electrically conductive support material used in the electrocatalytic layer.

In the present invention the electrically conductive support material is formed from particles having an average particle size of less than 5 microns (5 μm). Thus, as a maximum, the average particle size of the particles of the electrocatalytic metal which are deposited should be less than 1 micron (1 μm). Typically the average particle size will be significantly smaller than this. Preferably the particles of the electrocatalytic metal which are deposited have an average particle size of less than 0.2 microns (200 nanometers), and even more preferably less than 0.1 microns (100 nanometers), such as 2 to 50 nanometers. Preferred particles have an average particle size of 2 to 20 nanometers.

More generally, the electrocatalytic layer on the electrically conductive metal substrate (and comprising the at least one metal supported on an electrically conductive support material) is preferably formed by depositing on said substrate
   i. particles of the electrically conductive support material having an average particle size of less than 5 microns (5 μm), and
   ii. particles at the least one metal selected from platinum group metals, rhenium, nickel, cobalt and molybdenum having an average particle size which is less than 20% of the average particle size of the particles of the electrically conductive support material.

It should be noted that the particles of the at least one metal may be, and preferably are, already supported on the particles of the electrically conductive support material prior to the deposition on the substrate, as already described.

More generally, the application of the electrocatalytic layer to the electrically conductive metal substrate may be by any suitable technique, including those described in the art for other, e.g. anodic, applications. (Including the references describing anodic and cathodic coatings previously noted herein.) Typically a "paint" is formed and used for coating. The exact method to form this depends on the form of the materials to be used and the chosen method of applying it to the electrode, but such techniques are conventional and well-known to the person skilled in the art. For example, a paint can be formed by dissolving one or more metal precursor compounds in a suitable solvent, to which is added the insoluble support material, and which is then formed into a dispersion. If the metal is already supported on the support then a dispersion of the material may be formed without the separate dissolution of the metal compounds. Other additives, such as rheology modifiers, to maintain the dispersion or improve its viscosity for application can be added, as known to a person skilled in the art. Additionally, a binder may be added in the case where the metal is pre-supported on the carbon to assist in adhesion within the layer and to the electrode substrate.

A coating can be applied to the substrate by any suitable application method. Examples include dip coating and brush coating. A preferred example, particularly at commercial scale, is spray-coating. The electrocatalytic layer is preferably applied to the substrate by application of multiple coats. The use of multiple coats is advantageous in producing more uniform, denser, crack-free layers and the most effective coverage of the substrate (since it is statistically unlikely to miss any areas with more coats). Typically, 2 to 20 coats in total may be applied.

However applied, typically, after each coat the coating is dried prior to application of the next coat. Drying temperature depends on the coating technique, and in particular the solvents or solutions used, but typically takes place at 100-200° C. for 1-10 minutes. Depending on the coating technique it may also be advantageous to heat the coating at higher temperatures between each coat. In some embodiments this may be at temperatures in the range 300-500° C. for 10-30 minutes, although this depends also on the coating technique and temperatures and times outside these ranges can also be used. Some specific examples are described in the Examples herein. More generally, the methods by which electrodes may be coated are known in the art and the temperatures and conditions to be used can be determined by the person skilled in the art depending on the coating technique.

The electrically conductive metal substrate may be treated, physically or chemically, to improve the adhesion of the electrocatalytic layer. For example, the substrate may be grit (or sand) blasted, chemically etched or similar prior to coating to roughen the surface.

In some embodiments of the present invention a chemical layer may be provided between the electrically conductive metal substrate and the electrocatalytic layer. For example, a binder layer may be applied to the electrically conductive metal substrate prior to the electrocatalytic layer. As used herein a "binder layer" refers to a chemical layer which improves the adherence of the electrocatalytic layer to the electrically conductive metal substrate.

In other embodiments binders are not added prior to the electrocatalytic layer but may instead be coated with the electrocatalytic layer. This may be done by adding a binder, such as PTFE or an ionomer, to the coating dispersion comprising the:
   a. at least one metal selected from platinum group metals, rhenium, nickel, cobalt and molybdenum and
   b. at least 50% by volume of an electrically conductive support material, and applying the mixture as a coating.

Typically, electrocatalytic layers comprising binders are heat treated at a temperature sufficient to sinter the binder, this providing improved adhesion of the electrocatalytic layer.

In some embodiments of the present invention two or more electrocatalytic layers may be deposited sequentially on the substrate i.e. where each layer comprises:
   a. at least one metal selected from platinum group metals, rhenium, nickel, cobalt and molybdenum and
   b. at least 50% by volume of an electrically conductive support material, as defined herein, but where the layers as deposited differ in composition e.g. in one or more metals or support material used.

The first layer may be used to improve the adhesion of the subsequent layer or layers. It will be apparent that such layers may also be considered as a "binder layer" as defined above. However, for the purposes of the present application we will refer to them as "primer layers" when they also comprise both the metal and support materials as defined herein.

Where a primer layer is used then typically each layer may be formed by applying several coats of the required composition, such as, and independently, 2-10 coats of each composition. Preferably, where a primer layer is used, there are two electrocatalytic layers, being the primer layer and a second or "top" layer deposited thereon.

Other than the electrocatalytic layer on the cathode, the electrode assembly for the production of hydrogen according to the present invention may be of conventional design. An example of a preferred design is that described in U.S. Pat. No. 6,761,808 B1 already noted.

In use, the anode and cathode compartments will each contain a solution to be electrolysed. (The term "compartment" refers to the part of the anode or cathode structure which contains the anode or cathode and the solution to be electrolysed.) In use the assembly of the present invention may be used for any process in which an alkali metal hydroxide is present in the cathode compartment of an electrode assembly.

In one embodiment, the electrode assembly may be used for the production of hydrogen and a halogen. In this case the anode compartment contains a solution of an alkali metal halide which is electrolysed to produce the halogen. Preferably, the alkali metal halide is a chloride, and preferably sodium chloride. The alkali metal hydroxide is preferably sodium hydroxide. Electrochemical cells for the production of halogens and hydrogen are well known, such as described in U.S. Pat. No. 6,761,808 B1 already noted.

In another embodiment, the electrode assembly may be used for the production of hydrogen and oxygen. In this case the anode compartment also contains a solution of an alkali metal hydroxide, this being electrolysed to produce the oxygen. Preferably, the alkali metal hydroxide in both compartments is potassium or sodium hydroxide. Electrochemical cells for the production of oxygen and hydrogen are also well known, being generally referred to as alkaline water electrolysis. Reference may be made, for example, to Advances in Hydrogen Generation Technologies—Chapter 1 'Hydrogen Generation by Water Electrolysis' Youssef Naimi and Amal Antar—Section 4. (Published online by IntechOpen.)

The electrode assembly of the present invention comprises an anode structure which comprises an anode located within an electrolysis compartment and a cathode structure which comprises a cathode located within an electrolysis compartment.

In practise the electrode assembly will be utilised in a modular or filter press electrolyser comprising a plurality of connected electrode assemblies.

More specifically, the term "electrode assembly" as used herein encompasses both monopolar assemblies and bipolar assemblies, the latter being bipolar electrode units or bipolar electrode modules depending on how the anode and cathode structures are connected.

In particular, a "bipolar electrode unit" is an electrode assembly comprising an anode structure and a cathode structure which are electrically connected to each other. Bipolar electrode units may be connected to adjacent bipolar electrode units via a separator and sealing means between flanges on the adjacent units to form a filter press electrolyser.

An "electrode module" is an electrode assembly comprising an anode structure and a cathode structure which are separated by a separator between the respective flanges. The electrode module is provided with a sealing means to achieve a liquid and gas tight seal between the separator and the respective flanges. Electrode modules may be electrically connected to adjacent electrode modules to form a modular electrolyser.

Thus, in a second aspect provides a modular or filter press electrolyser comprising a plurality of electrode assemblies as described above. Typically, the modular or filter press electrolyser comprising 5-300 electrode assemblies.

Further details on bipolar electrode units, electrode modules, modular and filter press electrolysers can be found in the art, such as WO2016169813A1.

In a third aspect there is provided a process for electrolysis which comprises performing electrolysis in an electrode assembly or in a modular or filter press electrolyser as described above to produce hydrogen Further details on the operation of such systems may again be found in the art, such as WO2016169813A1. Typically, hydrogen evolving electrolysers, for example an alkaline water electrolyser, may be operated at pressures between 50 and 15000 kPa (0.5 and 150 bar) absolute, preferably between 50 and 500 kPa (0.5 and 50 bar) absolute. Where the electrolyser is a modular or filter press chlor alkali electrolyser, these are usually operated at pressures between 50 and 600 kPa (0.5 and 6 bar) absolute, preferably between 50 and 180 kPa (500 and 1800 mbar) absolute.

Liquid to be electrolysed is fed to inlet-tubes in each electrode structure. For example, inlet-tubes allow alkali metal hydroxide to be charged to the cathode structure and the desired solution to be charged to the anode structure. Products, for example chlorine and depleted brine solution from the anode structure and hydrogen and alkali metal hydroxide from the cathode structure in a chlor alkali process, are recovered from respective headers.

The electrolysis may be operated at high current density, e.g. >6 kA/m$^2$, in a chlor-alkali process.

As noted above, the coating of the present invention has been found to provide a low overpotential of the cathode, a cathode with a stable overpotential over prolonged periods of operation and a high level of reverse current tolerance.

Thus, in a fourth aspect the present invention provides for the use of an electrocatalytic layer on an electrode, said electrode comprising
  a) An electrically conductive metal substrate, and
  b) An electrocatalytic layer on the substrate, and comprising
    a. at least one metal selected from platinum group metals, rhenium, nickel, cobalt and molybdenum, and
    b. at least 50% by volume of an electrically conductive support material, wherein the electrically conductive support material is formed of particles having an average particle size of less than 5 microns (5 μm) and which are not metallic particles, to provide at least one of:
  i) a reduced overpotential of the electrode,
  ii) an overpotential of the electrode which is stable over prolonged periods of operation, and iii) an improved reverse current tolerance of an electrode.
In this fourth aspect use of the electrocatalytic layer preferably provides at least two of, and preferably all three of:
i) a reduced overpotential of the electrode,
ii) an overpotential of the electrode which is stable over prolonged periods of operation, and
iii) an improved reverse current tolerance of an electrode.

In particular, it is preferred that that the use of the electrocatalytic layer provides a reduced overpotential of the electrode which is stable over prolonged periods of operation and, most preferably, also an improved reverse current tolerance of an electrode.

Preferably the electrode is a cathode in a process for the production of hydrogen from said cathode. Most preferably, the process is a process for production of hydrogen from an alkali metal hydroxide at the cathode and either (1) a halogen from an alkali metal halide or (2) oxygen from an alkali metal hydroxide at the anode.

Finally, in a fifth aspect the present invention provides a method which comprises:
i) Producing an electrode comprising
 a) An electrically conductive metal substrate, and
 b) An electrocatalytic layer on the substrate and comprising
  a. at least one metal selected from platinum group metals, rhenium, nickel, cobalt and molybdenum, and
  b. at least 50% by volume of an electrically conductive support material, wherein the electrically conductive support material is formed of particles having an average particle size of less than 5 microns (5 µm) and which are not metallic particles, and
ii) Supplying said electrode for use as a cathode in a process for electrolysis of an alkali metal hydroxide to produce hydrogen.

The electrode may be produced by any known method, including those discussed above.

As used herein "supplying" may refer to the sale of an electrode where it is to be used as a cathode. This can include exporting the electrode from its country of manufacture.

The process for electrolysis of an alkali metal hydroxide to produce hydrogen is preferably a process for the production of hydrogen from the cathode and either (1) a halogen from an alkali metal halide or (2) oxygen from an alkali metal hydroxide at the anode. Such processes have been described already.

The present invention will be illustrated by reference to the following examples.

EXAMPLES

For clarification, the examples provided below include a range of coating formulations which are applied to different nickel metal electrode structures, the selection of which is determined by the test cell into which they are built for evaluation. In general each respective coating formulation is applied to each respective nickel metal electrode type to an equivalent coating level. It is also obvious to those with knowledge of the art of applying electrode coatings that those produced by hand e.g. by brush coating, and those produced by spraying give equivalent performance and the examples provided below reflect this.

For further clarification, the electrochemical tests are performed in a range of different electrolyser cell designs which utilise the different nickel metal electrodes to which the coating is applied, as is common to determine different aspects of the electrode coating performance. Test data is compared with counter examples of coating applied to identical nickel metal electrodes which are tested in the same cell configurations under identical operating conditions. The different tests electrode designs are described below:

(a) Single electrode potential (SEP) tests were carried out with samples of the coating applied to solid circular discs of area 1.65 $cm^2$ and thickness 1 mm (referred as "Type A" electrode) in a standard test to quickly determine the electrokinetic activity of the coatings (several tests per day, further details provided below).

(b) Full scale-FM21™ electrolyser tests employ a cathode that was a louvered nickel plate with a height of 22 cm and a width of 95 cm and a membrane and electrode area of approx. 0.21 $m^2$. The dimensions of the vertical nickel louvers were 220 mm high×2 mm wide×2 mm deep and the spacing between louvers was 2 mm (referred as "Type B electrode"). The anode was a louvered titanium plate of identical dimension to the cathode. A more detailed description of the electrodes and electrolyser construction is given in U.S. Pat. No. 4,824,542.

(c) Full scale-BICHLOR™ electrolyser tests were performed at 2.895 $m^2$ (membrane area) with coated expanded mesh of thickness 1 mm (referred to as "Type C" electrode). This test is used to assess the coating performance under real-world plant operating conditions (test duration several months to several years, further details provided below).

(d) Micropilot-scale tests were performed at 100 $cm^2$ (membrane area) using a coated expanded mesh of thickness 0.15 mm (referred to as "Type D" electrode). This is a standard test used to determine the impact of consecutive shorted shut-down events established to determine the reverse current tolerance of the cathode coating (test duration 20-30 days, further details provided below).

1. Single Electrode Potential Test 1.1. Experimental Set-Up

In these Examples, the electrochemical performance of the coatings was compared. The tests use an electrochemical cell of design commonly used in the characterisation of coatings by those with knowledge of the art.

The test electrode was "Type A", with an integrated 2 mm wide stub extending from the edge to allow connection into a titanium cell electrode holder with a titanium screw. The electrodes were produced from extended sheets which were grit-blasted with fused alumina to roughen the surface to improve adhesion of the coating and then ultrasonically cleaned in demineralised water. Once coated the electrodes were then cut from the sheet for use in the electrochemical cell.

The cell was operated containing 32% NaOH at 85° C., a platinum mesh counter electrode and a reversible hydrogen reference electrode (which provides a stable reference potential of 0.000V during the test) were used to establish a 3-electrode configuration typically used to perform such tests. The activity for hydrogen evolution reaction was determined by measuring the test electrode potential versus the reference electrode at a current density of 3 kA/m2 for a period until stable performance was observed (up to 5 hours). The measured data was corrected for electrolytic resistance by simultaneously measuring the cell impedance.

1.2. Formulations

Comparative Example 1A

This electrode ("Type A") was a grit-blasted nickel electrode without coating.

Comparative Example 2A

A paint was produced by diluting a stock solution of dihydrogen hexachloroplatinic acid (150 g/L in 20% HCl) with glacial acetic acid to give a final concentration of 22 g/L. This was sprayed in multiple layers onto the previously grit-blasted electrode with intermediate drying for 2 minutes at 180° C. and heat-treatment in air for 12 minutes at 480° C. between coats to convert the paint into a mixture of platinum metal and platinum oxide. Coating was repeated until the coating level was 3-4 g Pt/$m^2$ as measured by calibrated XRF. 3-4 g Pt/$m^2$ is a typical loading for platinum-type coating used in industrial applications to ensure long service life. In general, in short-term tests such as the present Examples, the initial overpotential is not strongly sensitive to the exact Pt loading as long as the electrode surface is evenly coated.

Comparative Example 3A

The platinum containing paint was produced as in Comparative Example 2A. This paint was then modified by adding and completely dissolving by vigorous stirring ruthenium(III)chloride crystals in sufficient quantity to give a molar composition 4.66:1 Pt:Ru (90% Pt, 10% Ru by weight).

This was sprayed in multiple layers onto the previously grit-blasted electrode ("Type A") with intermediate drying for 2 minutes at 180° C. and heat-treatment in air for 12 minutes at 480° C. between coats to convert the paint to a mixture of platinum metal, platinum oxide and ruthenium oxide. Coating was repeated until the coating level was 3-4 g Pt/$m^2$ as measured by calibrated XRF.

Comparative Example 4A

A paint was produced by completely dissolving ruthenium(III)chloride crystals in glacial acetic acid using ultrasonic waves to a concentration of 50 g Ru/L.

This was sprayed in multiple layers onto the previously grit-blasted electrode ("Type A") with intermediate drying for 2 minutes at 180° C. and heat-treatment in air for 12 minutes at 450° C. between coats to convert the paint into ruthenium oxide. Coating was repeated until the coating level was 10-12 g Ru/$m^2$ as measured by calibrated XRF.

10-12 g Ru/$m^2$ is a typical loading used in ruthenium electrodes used in industrial applications to ensure long service-life. In general, in short-term tests such as the present Examples, the initial overpotential is not strongly sensitive to the exact Ru loading as long as the electrode surface is evenly coated. Ru loadings are typically higher than comparable Pt loadings in typical industrial applications as Ru coatings generally wear must faster than Pt coatings.

Example 5A

This Example illustrates an electrode with an electrocatalytic layer comprising carbon and ruthenium. The carbon and the ruthenium are co-deposited in this example.

A paint was produced by first dissolving ruthenium(III) chloride crystals in glacial acetic acid to a concentration of 33 g Ru/L using ultrasonic waves for at least 10 minutes. To this was added carbon black powder (Cabot Vulcan XC-72R) at a concentration of 7.84 g C/L and this was dispersed with ultrasonic waves for at least 30 minutes to produce a slurry.

The resulting composition comprised 2:1 C:Ru by molar ratio (80.8% Ru, 19.20% C by weight). This was sprayed in multiple layers onto the previously grit-blasted electrode ("Type A") with intermediate drying for 2 minutes at 180° C. and heat-treatment in air for 12 minutes at 350° C. between coats to convert the paint into a carbon-supported amorphous ruthenium oxide coating. Coating was repeated until the coating level was 10-12 g Ru/$m^2$ as measured by calibrated XRF.

Example 6A

This Example illustrates an electrode with an electrocatalytic layer comprising carbon, platinum and ruthenium. The coating is applied as a "bi-layer".

A first layer was a C;Ru layer and was applied to a previously grit-blasted electrode ("Type A") by three coats using the same paint, coating and drying process given for Example 5A except that the heat treatment in air was performed at 450° C. between the coats.

This gives a nominal coat weight of 3 g Ru/m2.

The purpose of the first layer is to act as a primer layer to improve adhesion of the second layer to the electrode.

A second layer was applied on top of the first layer using a different paint. In particular, 1 g of a commercial carbon-supported platinum catalyst (Alfa Aesar HiSpec 4000, comprising 40 weight % platinum pre-decorated onto Vulcan XC-72R carbon black) was weighed into a suitable vessel. To this was added 20 $cm^3$ of demineralised water at room temperature and a slurry was produced with low-shear stirring using a laboratory stirrer plate and magnetic flea for 10 minutes. To the resulting slurry a poly(tetrafluoroethylene) (PTFE) emulsion (Asahi Glass AD309E at 59.8% PTFE) was added to act as a binder and in an amount to give an equivalent dry PTFE content of 0.12 g, equivalent to 20% by weight of the carbon.

The slurry was then mixed at high speed with the laboratory stirrer for 20 minutes before the pH was reduced to ~2 by addition of 1M H2504 to effect flocculation. The resulting slurry was further stirred for 10 minutes before being gravity filtered and washed with 200 ml of demineralised water to remove excess acid.

The resulting filter-cake was dried in an over at 80° C. in air for 2 hours to remove most the moisture content. The resulting solid was then transferred to a suitable vessel and broken down into the consistency of breadcrumbs using a spatula. To this was added 10 ml of 2% methyl cellulose gel which functioned as a rheology modifier in the final paint. The gel was produced separately by dissolving methyl cellulose powder (Alfa Aesar 4000cPs) into demineralised water followed by homogenisation with a high-shear mixer (Silverson L5, using an emulsor screen) until the powder was dissolved and a gel formed.

The mixture of filter-cake and gel was then mixed for 10 minutes using the high-shear mixer (Silverson L5, general purpose disintegrating head) until a dramatic decrease in viscosity was observed and the paint was converted to a free-flowing Newtonian-like fluid suitable for coating. The resulting paint was brush-coated onto the electrodes previously coated with the first layer. Three coats were applied with intermediate drying for 5 minutes at 100° C. between coats to achieve a coating level of 3-4 g Pt/m$^2$ as measured by calibrated XRF.

After the third coat the electrode was placed between filter-paper and pressed between the cold platens of a hydraulic press at a pressure of 400 pounds per square inch for 10 seconds to compact the layers.

The resulting bi-layer electrode was then heat-treated at 350° C. for 15 minutes in air. This causes the PTFE to melt and flow resulting in the formation of a robust electrode coating. (Lower heat-treatment temperatures resulted in less optimal binding of the carbon-platinum layer and higher temperatures were avoided to prevent decomposition of the PTFE.)

Example 7A

This Example illustrates an electrode with an electrocatalytic layer comprising carbon and platinum. The platinum is supported on the carbon prior to use ("pre-decorated").

The paint was manufactured by adding 1 g of a catalyst powder comprising 60 wt % Pt on a high surface area carbon support (Alfa Aesar HiSpec™ 9100) to a suitable vessel. To this was added 12 g of dipropylene glycol mono methyl ether (Dowanol™ DPM) and 6 g of a perfluorinated sulphonic acid ionomer dispersion (10% w/w Nafion™ DE1021 in water) to give a loading of 150% w/w polymer solids with respect to the carbon.

The purpose of the ionomer is to provide a binder that is chemically and electrochemically compatible within the operating environment of an electrolyser. The loading of 150% was found to give the optimal mechanical properties, with less than 100% resulting in poor adhesion while more than 200% resulted in a brittle electrode coating susceptible to spalling.

The catalyst ionomer mixture was processed in a high shear mixer for 5 minutes (Silverson L5, general purpose disintegrating head) to produce a stable viscoelastic paint suitable for spraying or brush coating, that did not settle out on standing.

This was applied in multiple layers onto a previously grit-blasted electrode ("Type A") using an airbrush (using nitrogen gas propellant) with intermediate drying and sintering of the ionomer in air for 2 minutes at 180° C. between coats. Coating was repeated until the coating level was 3-4 g Pt/m$^2$ as measured by calibrated XRF.

Once the correct coating level was attained the electrode was further heat-treated for 30 minutes at 180° C. to remove any remaining solvent.

Example 8A

This Example illustrates an electrode with an electrocatalytic layer comprising carbon, ruthenium and platinum. The ruthenium and platinum are supported on the carbon prior to use ("pre-decorated"). The electrode coating was produced in a similar manner as example 7A, except the catalyst powder used was a commercial 50% Pt 25% Ru on a high surface area carbon black (Alfa Aesar HiSpec™ 12100).
1.3. Results Table 1 provides the average electrochemical performance of the coatings for each example applied to electrode "Type A", the data being averaged several times across different electrodes/batches. The values presented are equal to the coating overpotential for the hydrogen evolution reaction.

TABLE 1

| Example | Composition | SEP vs RHE, Resistance free |
|---|---|---|
| Comparative Example 1A | Grit-blasted nickel no coating | −0.288 |
| Comparative Example 2A | Carbon-free Pt coating | −0.087 |
| Comparative Example 3A | Carbon-free PtRu coating | −0.084 |
| Comparative Example 4A | Carbon-free Ru coating | −0.086 |
| Example 5A | 2:1 C:Ru (molar ratio) | −0.060 |
| Example 6A | Layer 1 - 2:1 C:Ru (molar ratio) primer layer Layer 2 - 40% Pt on carbon XC-72R (pre-decorated) with 20% PTFE | −0.048 |
| Example 7A | 60% Pt on high surface area carbon (pre-decorated) with 150% Nafion ionomer | −0.060 |
| Example 8A | 50% Pt 25% Ru on high surface area carbon (pre-decorated) with 150% Nafion ionomer | −0.049 |

Comparative Example 1A provides the reference performance of the uncoated nickel electrode which was −0.288V vs RHE at 3 kA/m2 as measured by the single electrode potential test (SEP).

Comparative Examples 2A, 3A and 4A show the performance for typical carbon-support-free industrial chlor-alkali cathode coatings, c.a. −0.087V, −0.084V and −0.086V for pure platinum, platinum-ruthenium (molar composition 4.66:1 Pt:Ru) and pure ruthenium, respectively.

It can be seen that all three coating provide an improvement in overpotential (i.e. the potential becomes less negative) compared to an uncoated electrode (CE1), and all of a comparable extent.

Example 5A provides the performance of carbon-supported ruthenium (molar composition 2:1 C:Ru) which is −0.060V vs RHE. This demonstrates an improved overpotential for the hydrogen evolution reaction (by 24-27 mV) versus Comparative Examples 2A, 3A and 4A. This will translate to a similar cell voltage reduction in an industrial chlor-alkali electrolyser cell assembly. Example 5A shows the advantage of using the carbon supported ruthenium in enhancing the performance of the electrode.

Example 6A provides the performance of a bilayer electrode having a first later of carbon-supported ruthenium and a top layer comprising a pre-decorated carbon-supported platinum and a PTFE binder. The performance of this electrode structure is −0.048V vs. RHE. This demonstrates an improvement in overpotential of 36-39 mV versus Comparative Examples 2A, 3A and 4A.

Example 7A provides the performance of an electrode comprising a pre-decorated carbon-supported platinum layer and a Nafion™ ionomer binder. The performance of this electrode is −0.060V vs RHE. This demonstrates an overpotential improvement of 24-28 mV versus Comparative Examples 2A, 3A and 4A.

Example 8A provides the performance of a single electrode layer comprising a pre-decorated carbon-supported platinum and ruthenium layer and a Nafion™ ionomer binder. The performance of this electrode was −0.049V vs RHE. This demonstrates an overpotential improvement of 38 mV versus Comparative Examples 2, 3 and 4.

Examples 5A-8A therefore show that, compared to equivalent coating levels in the absence of carbon, the carbon-containing electrodes provide a significant performance benefit.

2. Full-Scale Monopolar Industrial Chlor-alkali Cell

2.1. Experimental Set-Up

The electrochemical performance was measured for extended periods in a full-scale industrial chlor-alkali pilot cell (FM21, 0.21 m² membrane area) comprising a single electrode assembly of the "Type B".

In each experiment the coated cathode electrode was tested against a standard anode coating (Chlorcoat™) and membrane (Aciplex™ A4202, Asahi Kasei). The cell build employed the same seals configuration, compression and internal configuration for each test.

The cell was operated at 85° C. (+/−2° C.) with typical industrial feed NaCl and NaOH concentrations at a current density of 3 kA/m2. As is common practice in industrial electrolytic cells operating with liquid electrolyte feeds, the voltage output from the cells was normalised to account for minor temperature and concentration fluctuations which occur during the tests. This strategy is obvious to those familiar with the art of operating such cells.

2.2. Formulations

Comparative Example 3B

Comparative Example 3A described above was reproduced with the same paint formulation on electrodes of "Type B".

Example 5B

Example 5A described above was reproduced with the same paint formulation on electrodes of "Type B".

Example 9B

This Example was produced on electrodes of "Type B" as described below.

The Example illustrates an electrode with an electrocatalytic layer comprising carbon, ruthenium and palladium. The ruthenium and palladium are co-deposited in this example.

A paint was produced by first dissolving ruthenium(III) chloride crystals in glacial acetic acid to a concentration of 33 g Ru/L using ultrasonic waves for at least 10 minutes. To this was added soluble palladium acetate crystals at a concentration of 3.86 g Pd/L and this was also dissolved with ultrasonic waves. To the salt solution was added carbon black powder (Cabot Vulcan XC-72R) at a concentration of 8.71 g C/L and this was dispersed with ultrasonic waves for at least 30 minutes to produce a slurry.

The resulting composition was 2:0.9:0.1 C:Ru:Pd by molar ratio (by weight 72.41% Ru 8.47% Pd 19.12% C).

This was sprayed in multiple layers onto a previously grit-blasted electrode with intermediate drying for 2 minutes at 180° C. and heat-treatment in air for 12 minutes at 450° C. between coats. Coating was repeated until the coating level was 10-12 g Ru/m² as measured by calibrated XRF.

Example 10B

This Example was produced on electrodes of "Type B" as described below. This Example illustrates an electrode with an electrocatalytic layer comprising carbon, ruthenium and platinum. The ruthenium and platinum are co-deposited in this example.

A paint was produced by first dissolving ruthenium(III) chloride crystals in glacial acetic acid to a concentration of 33 g Ru/L using ultrasonic waves for at least 10 minutes. To this was added dihydrogen hexachloroplatinic acid solution (150 g/L in 20% HCl) at a concentration of 7.08 g Pt/L. To the salt solution was added carbon black powder (Cabot Vulcan XC-72R) at a concentration of 8.71 g C/L and this was dispersed with ultrasonic waves for at least 30 minutes to produce a slurry. The resulting composition was 2:0.9:0.1 C:Ru:Pt by molar ratio (by weight 67.63% Ru 14.50% Pt 17.86% C).

This was sprayed in multiple layers onto a previously grit-blasted electrode with intermediate drying for 2 minutes at 180° C. and heat-treatment in air for 12 minutes at 450° C. between coats. Coating was repeated until the coating level was 10-12 g Ru/m² as measured by calibrated XRF.

2.3. Results

Table 2 provides the normalised cell voltage for each Example applied to Electrode "Type B".

TABLE 2

| Example | Composition | Normalised Cell Voltage (V) |
|---|---|---|
| Comparative Example 3B | Carbon-free Pt:Ru coating | −2.934 |
| Example 5B | 2:1 C:Ru (molar ratio) - heat-treated to 350° C. | −2.857 |
| Example 9B | 2:0.9:0.1 C:Ru:Pd (molar ratio) - heat treated to 450° C. | −2.820 |
| Example 10B | 2:0.9:0.1 C:Ru:Pt(molar ratio) - heat treated to 450° C. | −2.840 |

Comparative Example 3B provides the performance for a typical carbon-support-free industrial platinum-ruthenium coating.

Example 5B provides the performance of a carbon-supported ruthenium coating (molar composition 2:1 C:Ru). The normalised cell voltage is improved by 0.077 V compared to Comparative Example 3B. This is slightly larger than, but consistent with the results for the equivalent Examples in the Single Electrode Potential Tests with electrode "Type A" and demonstrates the advantage of using the carbon-supported ruthenium in enhancing the performance of the electrode on an industrial scale.

Example 9B provides the performance of a carbon, ruthenium and palladium containing coating. The normalised cell voltage is improved by 0.114 V compared to Comparative Example 3B, and 0.037 V compared to Example 5B in the same cell.

Example 10B provides the performance of a carbon, ruthenium and platinum containing coating. The normalised cell voltage is improved by 0.094 V compared to Comparative Example 3B in the same cell, and 0.017 V compared to Example 5B in the same cell.

These Examples show that further improvements can be made by mixtures of metals with the carbon.

3. Full-Scale Bipolar Industrial Chlor-alkali Cell

3.1. Experimental Set-Up

The electrochemical performance was measured for extended periods in a full-scale industrial chlor-alkali electrolyser (supplier, INOVYN Technologies Ltd) with "Type C" electrodes.

The cathodes comprised in each case expanded nickel electrodes, the dimensions of each being approximately 1.2 m×1.2 m, and which are coated as described below.

The coated electrodes were welded into full scale BICHLOR™ cathode pans, with 2 electrodes welded side by side using standard production techniques. The approximate projected electrode area of each finished pan was 2.9 m².

Chlor-alkali modules for use in a BICHLOR™ electrolyser were built by bolting the above formed cathode pans to BICHLOR™ anode pans with a membrane separator between the anode and cathode electrodes, the membrane being sealed into the module by 2 PTFE protected EPDM rubber gaskets (supplier INOVYN Technologies Ltd) located around the periphery of the membrane (one gasket on each side of the membrane) and compressed between the membrane and the flange of the pan by torqued bolts inserted through the 2 flanges, membranes and gaskets. The anode pans each contained 2 coated expanded metal anode electrode meshes coated with a standard INOVYN "Chlorcoat™" anode coating and welded side by side into the anode pans using standard production techniques for those pans. The design of the anode, cathode and the assembly of the modules are described in detail in U.S. Pat. No. 6,761,808 B1.

The electrolyser contained 14 modules of the above-type, configured as described below. In operation the electrolyser was fed with NaOH at approx. 30% concentration and feed brine at approx. 300 g/litre concentration. The concentrations of exit brine and exit NaOH were respectively approx. 220 g/l and approx. 32%. The electrolyser was operated at a liquor exit temperature of 87° C., a gas pressure of 235 mbarg chlorine and 250 mbarg hydrogen, and at current densities between 5.5 KA/m² and 6 KA/m².

3.2. Formulations

Example 3C

Twenty cathodes were produced using the same paint and same methodology as Examples 3A and 3B.

The electrodes were welded in pairs into cathode pans, as described above, and then connected to anodes, also as described above, to form ten modules. In five of the modules the membrane separator used was Aciplex F6801 supplied by Asahi Kasei Corporation of Japan ("module example 3C1" below in Table 3) and in the other five finished modules the separator used was Flemion F8080 supplied by Asahi Glass Co. Ltd of Japan. ("module example 3C2" below in Table 3).

Example 10C

Eight cathodes were produced using the same paint and same methodology as Examples 10B. The electrodes were welded in pairs into cathode pans, as described above, and then connected to anodes, also as described above, to form four modules. In two of the modules the membrane separator used was Aciplex F6801 supplied by Asahi Kasei Corporation of Japan ("module example 10C1" below in Table 3) and in the other two modules the separator used was Flemion F8080 supplied by Asahi Glass Co. Ltd of Japan. ("module example 10C2" below in Table 3).

All 14 modules were built into a BICHLOR™ chlor alkali electrolyser and operated simultaneously.

3.3. Results

Table 3 provides the average voltage for each module type at start-up.

TABLE 3

Start up performance of cathode

| Example | Coating type | Membrane type | Average voltage of modules* at start-up |
|---|---|---|---|
| Comparative Example 3C1 | Carbon-free Ru/Pt coating | Aciplex F6801 | −3.053 V |
| Comparative Example 3C2 | Carbon-free Ru/Pt coating | Flemion F8080 | −3.037 V |
| Example 10C1 | 2:0.9:0.1 C:Ru:Pt(molar ratio) - heat treated to 450° C. | Aciplex F6801 | −2.985 V |
| Example 10C2 | 2:0.9:0.1 C:Ru:Pt(molar ratio) - heat treated to 450° C. | Flemion F8080 | −2.940 V |

*Voltage normalised to 6 KA/m², 90° C., 32% NaOH concentration and 235 mbar chlorine pressure The table shows that comparing between modules with the same membrane type the average start-up voltage of the modules containing the co-deposited carbon, ruthenium and platinum coating was improved by 65-90 mV compared to the average start-up voltage of the non-carbon containing ruthenium and platinum coating at a current density of 6.0 KA/m2.

After 2 months of continuous operation at current densities between 5.5 KA/m2 and 6.0 KA/m2 the voltages of all four examples were identical to those measured at start-up showing that the cathodes were stable and maintained the advantageously lower voltage.

4. Stability During Start-Up and Shutdowns 4.1. Experimental Set-Up

Micropilot test were carried out at 100 cm2 (membrane electrode area) using a coated expanded cathode mesh of thickness 0.15 mm (Type "D" electrode) in a standard single cell fixture and test, routinely used to determine the impact of numerous consecutive shutdowns on the performance of the cathode coating.

In normal plant operation industrial electrolysers are infrequently shutdown and hence the test described here allows multiple shutdowns to be performed in a relatively short period to simulate effects which would normally accumulate in a plant over several years' operation.

It is common practice to shut-down bipolar industrial chlor-alkali electrolysers while maintaining the passage of a small "forward" current (the magnitude is dependent on the membrane area and number of modules in the electrolyser) to prevent the flow of reverse currents between adjacent cells and to protect the electrode coatings, especially the cathode coating, from damage. Hence a further aspect of this test is to shut-down the cell without this protection and to allow the flow of reverse current by externally shorting the anode and cathode electrodes (which occurs spontaneously in bipolar cells as anodes and cathodes are in electrical contact). Under these test conditions, a coating which is not reverse current tolerant will degrade and this will be apparent from the cell voltage, which will grow (negatively).

The test cell comprises a titanium anode frame with a square cut out into which an expanded titanium mesh is welded and coated with CHLORCOAT™ standard anode coating which is tolerant to reverse currents (hence will not affect the results of the test). An identical nickel cathode frame with cut out is used, into which the coated cathode mesh is fitted using mechanical springs to hold it in position against the membrane and to maintain electrical contact. The cell is completed by sandwiching the anode and cathode frames (with meshes) together with two gaskets and a standard chlor-alkali industrial membrane (Flemion F8080, Asahi Glass). In this configuration the current is collected from the edge of the two frames.

Further plates are built either side of the anode and cathode frames to provide the reactant feeds and collection of products and to provide heating using electrical resistance heaters. Two plates are fitted at the ends of the cell which are used to compress the assembly using tie-rods at a pre-defined torque.

The anode compartment of the cell is fed with a regulated flow of brine at a concentration of 250 g/kg to maintain an exit concentration of 185 g/kg. The cathode compartment is fed with a regulated flow of demineralised water to maintain an exit concertation of 315 g/kg. Tests are carried out at 85° C.

The experiment to assess the stability of the coating is carried out by first running the cathode samples for several days until stable cell voltage is attained at a forward current density of 4 kA/m2. Then the DC power supply is turned off and the anode and cathode shorted externally using a switch for a period of 1 hour. Under these conditions the cell voltage quickly rises to 0V and a reverse current (flowing from cathode to anode) is observed to flow spontaneously. The forward current is then switched back on and the cell held for 24 hours at 4 kA/m2 until the cell voltage is again stable. The current is then switched off and the cell once again shorted, repeating this process 10-30 times while monitoring the stabilised cell voltage for change at 4 kA/m2. A cell voltage change of 300 mV versus the beginning of the test (increases more negatively) is indicative of severe cathode coating damage, with the electrode eventually behaving as if it were comprised of uncoated nickel.

Thus, coatings which are unstable during shutdowns where reverse currents flow showed significant change in voltage.

4.2. Formulations

Comparative Example 4D

An electrode was produced using the same paint and same methodology as Example 4A onto electrodes of "Type D" to produce Comparative Example 4D.

Example 5D

An electrode was produced using the same paint and same methodology as Example 5A and 5B. onto electrodes of "Type D" to produce Example 5D.

4.3. Results

The FIGURE shows the cell voltage versus the number of shutdown cycles for Comparative Example 4D and Example 5D. Table 4 provides a summary of the data presented in the FIGURE.

| Example | Coating Type | Cell Voltage Before Shutdown Cycling | Cell Voltage After Shutdown Cycling | Number of Shutdowns Completed |
|---|---|---|---|---|
| Comparative Example 4D | Carbon-free Ru | −2.85 | −3.04 | 7 |
| Example 5D | Carbon-supported Ru | −2.82 | −2.82 | 43 |

Comparative Example 4D demonstrates a start-up cell voltage of −2.85V while Example 5D demonstrates an improvement of 30 mV with a cell voltage of −2.82V. This demonstrates ruthenium carbon coating is also more active than just the ruthenium coating, at an equivalent coat weight on Electrode "Type D".

Comparative Example 4D shows a dramatic change of cell voltage during only 7 shutdown cycles, degrading to −3.04V (equivalent to a cell voltage change of 190 mV).

Example 5D on the other hand shows no significant change of cell voltage during 43 shutdown cycles. This Example demonstrates the carbon-ruthenium coating has significantly better tolerance to shutdowns.

The invention claimed is:

1. An electrode assembly for the production of hydrogen comprising:
   i) an anode structure which comprises an anode located within an anode electrolysis compartment,
   ii) a cathode structure which comprises a cathode located within a cathode electrolysis compartment containing a solution of an alkali metal hydroxide,
   wherein the cathode comprises:
   a) An electrically conductive metal substrate, and
   b) An electrocatalytic layer on the substrate said layer comprising at least one metal supported on an electrically conductive support material, wherein
      a. the at least one metal is selected from platinum group metals, rhenium, nickel, cobalt and molybdenum, and
      b. the electrocatalytic layer comprises 90 to 99.8% by volume of the electrically conductive support material, and wherein the electrically conductive support material is formed of particles having an average particle size of less than 5 μm (5 microns) and which are not metallic particles, the electrically conductive support material having a surface area of 50 m²/g to 2000 m²/g, and
      c. the electrocatalytic layer has a thickness of 0.5 to 100 μm, and a porosity in the form of a three-dimensional network of channels between the deposited particles which channels have an average diameter of between 5 and 500 nm, and wherein the electrocatalytic layer comprises 0.2 to 10% by volume of the at least one metal.

2. An assembly according to claim 1 wherein the at least one metal comprises at least one platinum group metal.

3. An assembly according to claim 2 wherein the at least one metal comprises ruthenium.

4. An assembly according to claim 3 wherein the at least one metal comprises ruthenium and platinum.

5. An assembly according to claim 1 wherein the electrically conductive support material comprises an electrically conductive carbon material.

6. An assembly according to claim 1 wherein the electrically conductive support material has a surface area of at least 50 m²/g.

7. An assembly according to claim 1 wherein the electrically conductive support material is formed of particles having an average particle size of less than 1 μm (1 micron).

8. An assembly according to claim 1 wherein the cathode further comprises a binder.

9. An assembly according to claim 1 wherein the cathode comprises two or more electrocatalytic layers wherein the electrocatalytic layers as deposited differ in composition.

10. An assembly according to claim 1 wherein the anode electrolysis compartment contains a solution of an alkali metal halide, and wherein the assembly is configured to produce hydrogen and a halogen.

11. An assembly according to claim 1 wherein the anode electrolysis compartment contains a solution of an alkali metal hydroxide, and wherein the assembly is configured to produce hydrogen and oxygen.

12. A modular or filter press electrolyser comprising a plurality of electrode assemblies as claimed in claim 1.

13. A process for electrolysis which comprises performing electrolysis in an electrode assembly according to claim 1 to produce hydrogen.

14. A method comprising:
  i) Producing an electrode comprising
    a) An electrically conductive metal substrate, and
    b) An electrocatalytic layer on the substrate said layer comprising at least one metal supported on an electrically conductive support material, wherein
      a. the at least one metal is selected from platinum group metals, rhenium, nickel, cobalt and molybdenum, and
      b. the electrocatalytic layer comprises 90 to 99.8% by volume of the electrically conductive support material, wherein the electrically conductive support material is formed of particles having an average particle size of less than 5 μm (5 microns) and which are not metallic particles, the electrically conductive support material having a surface area of 50 $m^2/g$ to 2000 $m^2/g$, and
      c. the electrocatalytic layer has a thickness of 0.5 to 100 μm, and a porosity in the form of a three-dimensional network of channels between the deposited particles which channels have an average diameter of between 5 and 500 nm, and wherein the electrocatalytic layer comprises 0.2 to 10% by volume of the at least one metal, and
  ii) Supplying said electrode for use as a cathode in a process for electrolysis of an alkali metal hydroxide to produce hydrogen.

15. A method according to claim 14 wherein the process for electrolysis of an alkali metal hydroxide to produce hydrogen is a process for the production of hydrogen from the cathode and either (1) a halogen from an alkali metal halide or (2) oxygen from an alkali metal hydroxide an anode.

16. An assembly according to claim 1 wherein the electrically conductive support material has a surface area of 200 to 1000 $m^2/g$.

17. An assembly according to claim 7 wherein the electrically conductive support material is formed of particles having an average particle size of 10 to 250 nanometers.

18. An assembly according to claim 17 wherein the electrically conductive support material is formed of particles having an average particle size of 20 to 100 nanometers.

19. An assembly according to claim 8, wherein the binder is coated with the electrocatalytic layer of the cathode.

20. The modular or filter press electrolyser according to claim 12, wherein the plurality of electrode assemblies comprises 5-300 electrode assemblies.

21. The process for electrolysis according to claim 13 wherein the electrolysis is performed in a modular or filter press electrolyser comprising a plurality of said electrode assemblies, to produce hydrogen.

22. An assembly according to claim 1 wherein the electrocatalytic layer is applied to the substrate by spray-coating and by application of multiple coats.

* * * * *